United States Patent
Lee

(10) Patent No.: US 6,354,193 B1
(45) Date of Patent: Mar. 12, 2002

(54) ROASTER OVEN FOR ROASTING HOT DOG

(76) Inventor: Ming-Tsung Lee, P.O. Box 90, Tainan City (TW)

( * ) Notice: Subject to any disclaimer, the term of this patent is extended or adjusted under 35 U.S.C. 154(b) by 0 days.

(21) Appl. No.: 09/816,463

(22) Filed: Mar. 26, 2001

(51) Int. Cl.⁷ .............. A23L 1/00; A47J 37/00; A47J 37/04; A47J 37/07; A47J 37/08
(52) U.S. Cl. .............. 99/334; 99/339; 99/340; 99/423; 99/427; 99/441
(58) Field of Search .................. 99/339, 340, 326–333, 99/419–421 V, 422, 423–425, 426, 427, 421 C, 441, 421 R, 444–449; 219/521, 400, 538, 492, 389, 386, 401–404; 126/21 A, 41 R, 25 R

(56) References Cited

U.S. PATENT DOCUMENTS

| | | | | |
|---|---|---|---|---|
| 2,185,979 A | * | 1/1940 | Dumas | 99/423 |
| 2,604,842 A | * | 7/1952 | Dolce | 99/441 X |
| 2,697,395 A | * | 12/1954 | Steriss | 99/423 |
| 3,331,308 A | * | 7/1967 | Hoffert | 99/340 |
| 3,472,156 A | * | 10/1969 | Bardeau et al. | 99/423 |
| 3,854,392 A | * | 12/1974 | Eason | 99/441 X |
| 4,370,920 A | * | 2/1983 | Henriques | 99/339 |
| 4,373,431 A | * | 2/1983 | Wallick et al. | 99/441 X |
| 4,516,485 A | * | 5/1985 | Miller | 99/339 |
| 5,117,748 A | * | 6/1992 | Costa | 99/441 |
| 6,079,319 A | * | 6/2000 | Doria | 99/427 X |
| 6,178,879 B1 | * | 1/2001 | Park | 99/427 X |

\* cited by examiner

Primary Examiner—Timothy F. Simone

(57) ABSTRACT

A roaster oven for roasting hot dog includes a roaster oven body, a roast frame and a transmitting device combined together. The roaster oven body has an opening on a top side for the roast frame to fit therein, and the transmitting device is driven to rotate together with rollers inside the roast frame so as to permit food placed on between two rollers rotate automatically to acquire effectiveness of heating and roasting food in a balanced condition.

4 Claims, 5 Drawing Sheets

ROASTER OVEN FOR ROASTING HOT DOG

BACKGROUND OF THE INVENTION

1. Field of the Invention

This invention relates to a roaster oven for roasting hot dog, particularly to one having an opening on a top side for fitting in a roast frame with a plurality of orderly arranged rollers driven by a transmitting device to turn around together with long-shaped food being placed for roasting on between two rollers, possible to heat and roast food in a balanced condition

2. Description of the Prior Art

A known conventional roaster oven, as shown in FIG. 1, is installed with plural electric heating tubes 10 on inner walls and a roast tray 11 on bottom side for placing food to be roasted.

However, in the known conventional roaster oven, food being roasted (such as hot dog, sausage, ham, etc.) is liable to be scorched on one side but still keeping cold the other side on account of failing to turn it around timely and smoothly.

SUMMARY OF THE INVENTION

One objective of the invention is to offer a roaster oven available for roasting hot dog, possible to make use of energy source sufficiently, and let food being roasted turn automatically to attain effect of heating and roasting in a balanced condition.

Another objective of the invention is to offer a roaster oven for roasting hot dog, possible to economize a space for storing and convenient to roast long-shaped food.

The feature of the invention is an opening formed on a top side of a roaster oven body, a roast frame provided in the oven body, having a frame case with a number of rollers arranged in a line and having respectively a fit member at one end, and a transmitting device installed in a space within one side of the roaster oven body and composed of a frame plate, a synchronous motor, plural transmitting wheels, pivotal shafts, plural drive wheels, drive shafts and connect rods. The transmitting wheels and the drive wheels engage with one another in a vertical condition. Each pivotal shaft is inserted in each transmitting wheel, and each drive shaft fitted in each drive wheel, with one end of each aforesaid shaft fitted with the frame plate. Further, the shaft of one of the transmitting wheels is connected with the spindle of the synchronous motor for mutual rotating, and the other end of each drive shaft combined with the fit member at one end of each roller by means of a connect rod.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
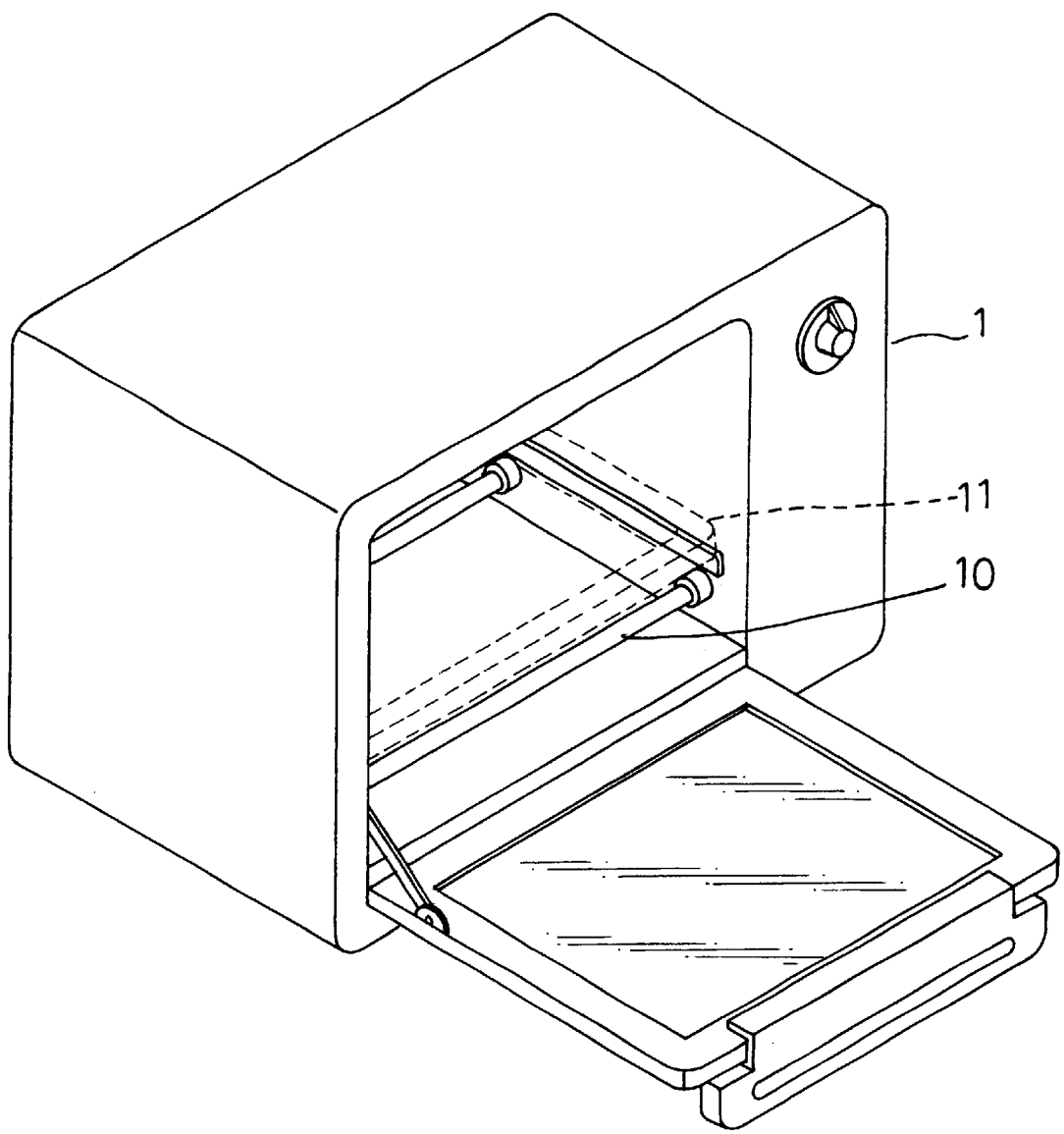
FIG. 1 is a perspective view of a known conventional roaster oven.
Figure 2:
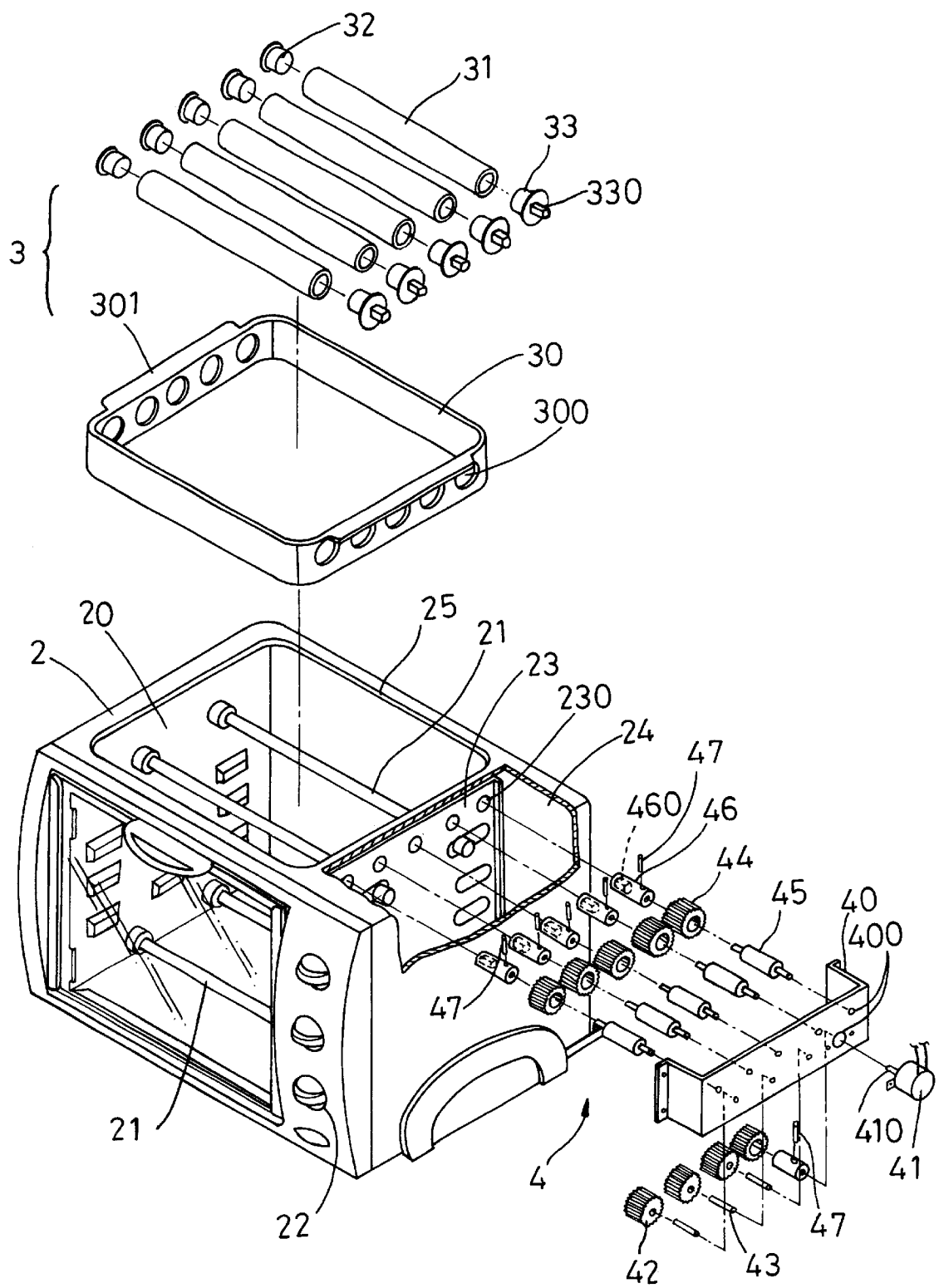
FIG. 2 is an exploded perspective view of a roaster oven in the present invention.
Figure 3:
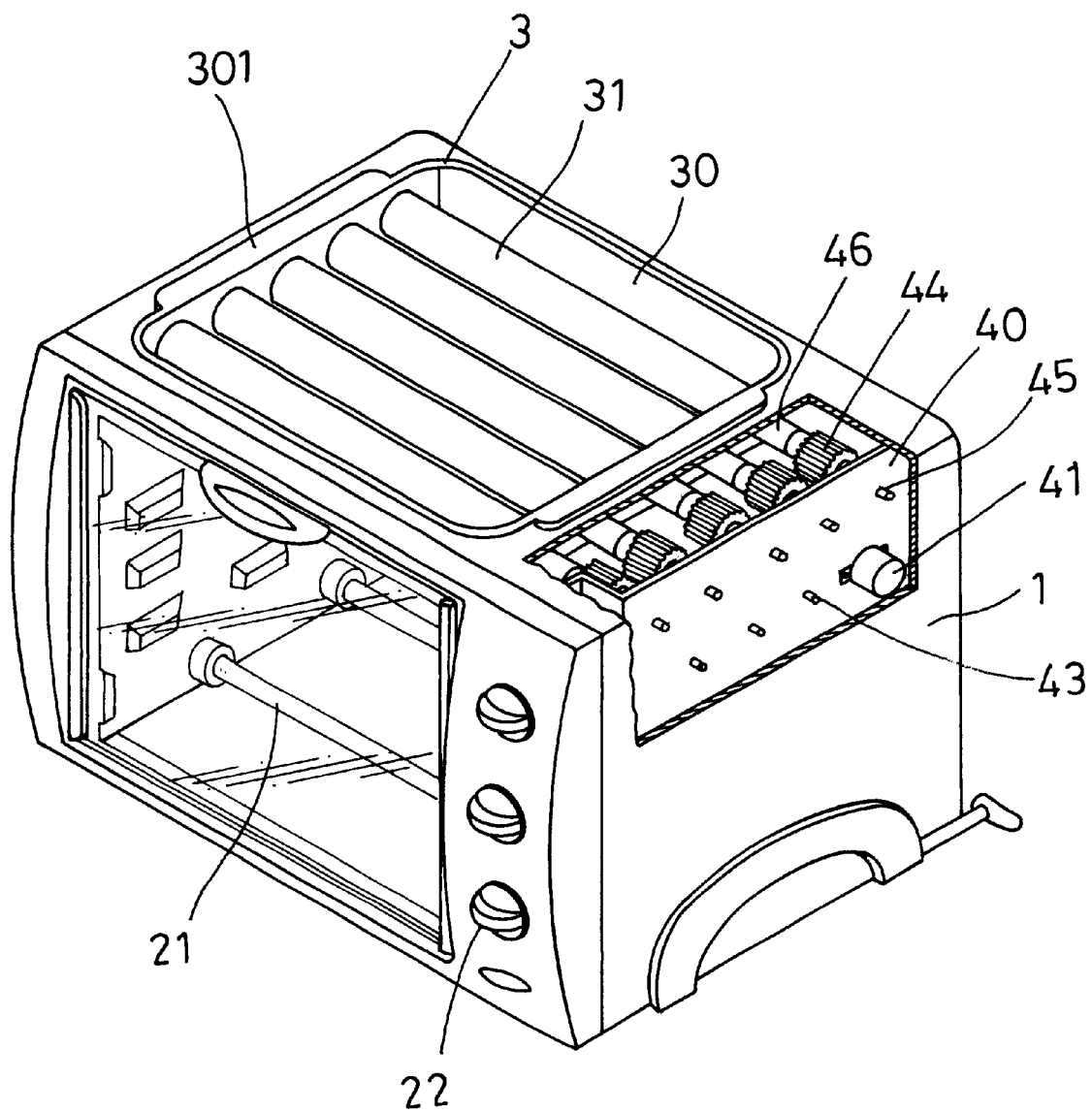
FIG. 3 is perspective view of the roaster oven in the present invention.

A preferred embodiment of a roaster oven for roasting hot dog, as shown in FIGS. 2 and 3, includes a roaster oven body 2, a roast frame 3 and a transmitting device 4 as main components combined together.

The roaster oven body 2 has a chamber 20 with an opening on a top side for accommodating food to be roasted, and a control switch 22 installed on a faceplate near a front door, with its wires provided hidden in a space of an inner wall plate 23 of the roaster oven body 2. The wall plate has a plurality of insert holes 230 bored spaced apart in a line on an upper portion. Besides, plural electric heating tubes 21 are installed under the opening 25 and above the bottom of the chamber 20.

The roaster frame 3 is positioned within the opening 25 above the electric heating tubes 21, provided with a frame case 30 having in two opposite sides plural corresponding through holes 300 and two opposite lips 301 formed on two opposite edges and resting on the edges of the opening 25 of the roaster oven body 2. Then, a number of rollers 31 arranged in a line in the frame case 30 are assembled with the frame case 30 by means of fit members 32,33 inserting through the through holes 300 of the frame case 30 from outside and fixed with the ends of the rollers 31, and each fit member 33 has an insert projection 330 protruding outward for passing through each through hole 230 on the wall plate 23.

The transmitting device 4 is provided in the space between the inner side wall 23 and the outer side wall of the roaster oven body 2, having a U-shaped frame plate 40 with its bending ends fixedly screwed with the inner wall plate 23. Further, the frame plate 40 has a number of shaft holes 400 bored spaced apart in a line, and a synchronous motor 41 threadably fixed at a proper position on the frame plate. Then, pivotal shafts 43 pass through plural transmitting wheels 42 and fitting in the lower shaft holes 400 of the frame plate 40, and one of the transmitting wheels 42 is connected with the spindle 410 of the synchronous motor 41.

In addition, a plurality of drive shafts 45 are fitted pivotally with the plural wheels 44, having one end fitted in each upper shaft hole 400 of the frame plate 40 and the other end fixed with a connect rod 46 by means of a pin 47. Furthermore, the connect rods 46 are provided with insert holes 460 at their ends for fitting with same-shaped insert rods 330 protruding out from fit members 33 at one end of the roller 31. Additionally, the transmitting wheels 42 engage respectively the drive wheels 44 in a vertical condition if viewed sideward, as shown in FIG. 4.

Figure 4:
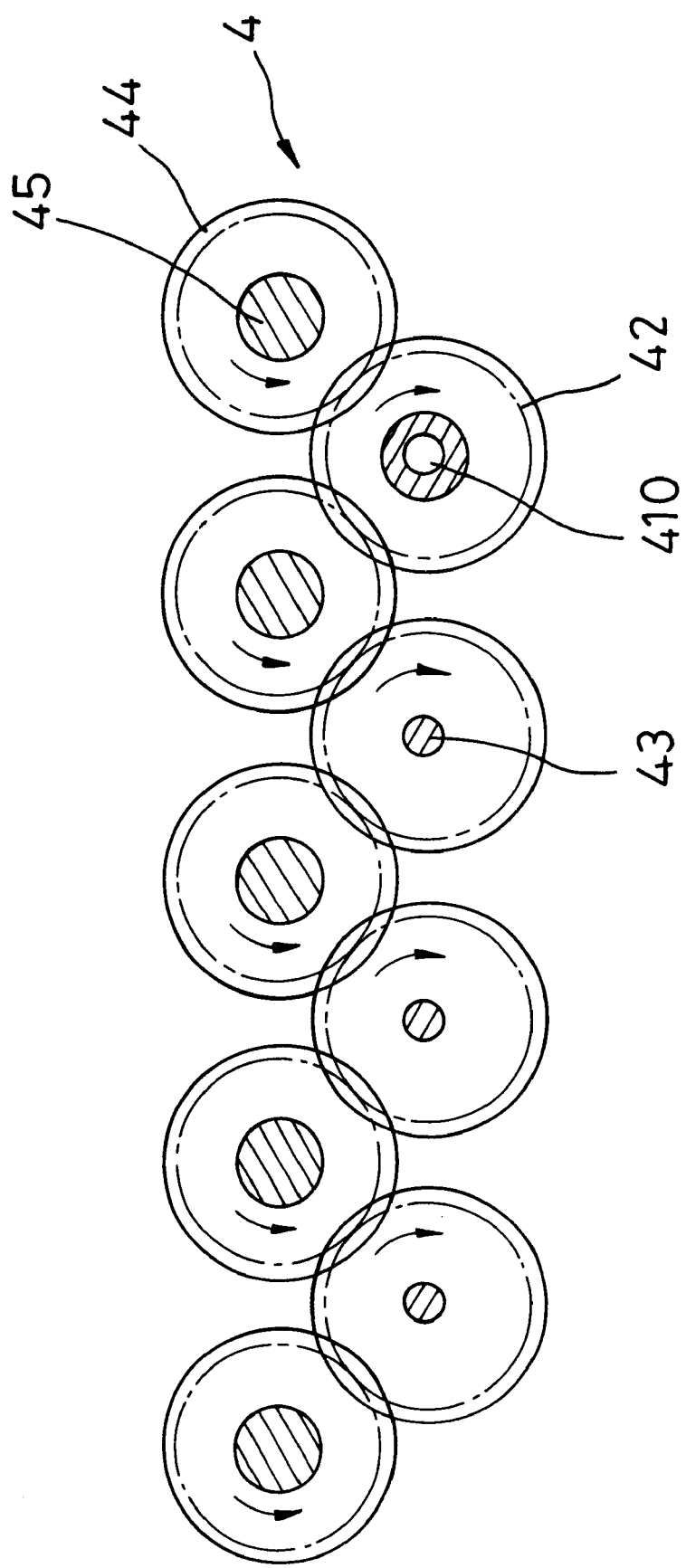
FIG. 4 is a magnified side view of transmitting wheels and drive wheels in engaging condition in the present invention; and, FIG. 5 is a perspective view of the roaster oven in process of roasting hot dog in the present invention.

In assembling, referring to FIGS. 2, 3, 4, and 5, firstly, insert each pivotal shaft 43 in each transmitting wheel 42, with one end fitted in each lower shaft hole 400 of the frame plate 40, and each drive shaft 45 is fitted in each drive wheel 44, with one end fitted in each upper shaft hole 400, permitting the transmitting wheels 42 and the drive wheels 44 engage each other, as shown in FIG. 4, and then the outermost transmitting wheel 42 is fixed with the spindle 410 of the synchronous motor 41. Next, the other end of each drive shaft 45 passing through the drive wheel 44 is fitted in one end of the connect rod 46 which has an insert hole 460 in the other end facing the through hole 230 of the wall plate 23 of the roaster oven body 2. Subsequently, arrange the rollers 31 in the frame case 30, letting both ends of each roller 31 facing the through holes 300 in the two opposite sides of the frame case 30 and then combine them with the frame case 30 together by means of the fit members 32,33 inserting from outside in the through holes 30. Lastly, position the assembled roast frame 3 into the opening 25 of the roaster oven body 2, and insert protruding-out insert rods 330 of the rollers 31 into the insert holes 460 of the connect rods 46 of the transmitting device 4, thus finishing assembly of the roaster oven.

Figure 5:
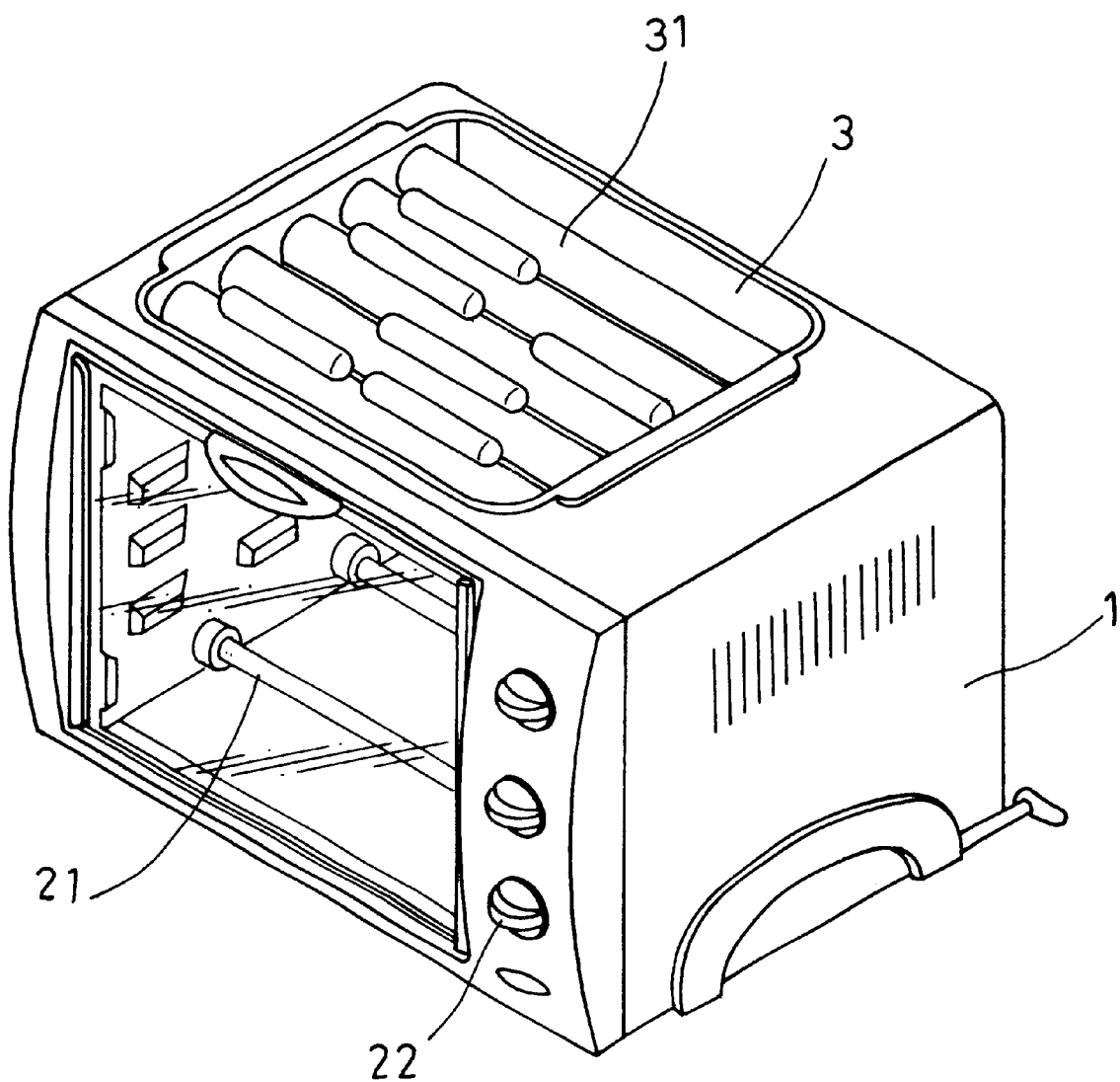

In using, turn on the control switch 22 of the roaster oven body 2 to start the synchronous motor 41 of the transmitting device 4, letting the spindle 410 of the motor 41 turning one of the transmitting wheels 42 fixedly connected with it. Then, at the same time, the drive wheels 44 and the other transmitting wheels 42 and the rollers 31 in the roast frame 3 are actuated to rotate together, as shown in FIG. 4, because the fit members 33, the connect rods 46 and the drive shafts 45 are relatively strung together. When long-shaped food such as hot dog, sausage, ham and the like is to be roasted, just place it on between two rollers 31, as shown in FIG. 5, to let it rotate together with the rollers 31, thus attaining effectiveness of heating and roasting food in a balanced condition.

While the preferred embodiment of the invention has been described above, it will be recognized and understood that various modifications may be therein and the appended claims are intended to cover al such modifications that may fall within the spirit and scope of the invention.

What is claimed is:

1. A roaster oven for roasting hot dog comprising:

a roaster oven body having a chamber inside and a control switch installed on a side faceplate, said control switch having its wires hidden in a space between said roaster oven body and its inner wall plate, plural electric heating tubes installed at proper positions of an upper and a lower portions of said chamber;

characterized by said roaster oven body having an opening on a top side, a roast frame placed in said opening of said roaster oven body and provided with a frame case, said frame case having a number of rollers arranged in parallel and in a line, then a transmitting device positioned in a space between two side walls of said roaster oven body and composed of a frame plate, a synchronous motor, plural transmitting wheels, pivotal shafts, plural drive wheels, drive shafts and connect rods, said transmitting wheels and said drive wheels engaging with one another in a vertical condition, each said pivotal shaft passing through each said transmitting wheel and having one end fitted with a lower shaft hole of said frame plate, and said drive shaft passing through said drive wheel and having one end fitted in an upper shaft hole of said frame plate, one of said transmitting wheels connected to said spindle of said synchronous motor rotating said transmitting wheels and said drive wheels, the other end of each said drive shaft fitted with said fit member at one end of said roller by mean of a connect rod;

in handling, turn on said control switch to start said synchronous motor to rotate said transmitting wheels and said drive wheels, and at the same time said rollers in said frame case actuated to rotate by means of said drive shafts, said connect rods and said fit members which are strung together, so that food being roasted on between two said rollers can be turned around automatically and heated and roasted in a balanced condition.

2. The roaster oven for roasting hot dog as claimed in claim 1, wherein said roaster oven body has a number of through holes bored spaced apart in a line in an upper portion of said inner wall plate of said roaster oven body.

3. The roaster oven for roasting hot dog as claimed in claim 1, wherein two opposite sides of said frame case are respectively provided with plural through holes for receiving said fit members which insert from outside of said through holes to be fixed with both ends of said rollers, said frame case having lips formed on two opposite edges to rest on two opposite edges of said opening of said roaster oven body.

4. The roaster oven for roasting hot dog as claimed in claim 1, wherein said frame plate of said transmitting device is fixedly screwed with said wall plate of said roaster oven body, having a number of shaft holes arranged in a line on an upper and a lower portion, each said pivotal shaft passing through said transmitting wheel and having one end fitted in each said lower shaft hole, each drive shaft passing through each said drive wheel and having one end fitted in said upper shaft hole, letting said drive wheels located on said transmitting wheels and engaging each other in a vertical condition, the other end of each said drive shaft fitting with said connect rod which faces said through hole of said wall plate, assembled with said fit member at one end of each said roller by mutual engagement of a protruding insert rod of each said fit member and an insert hole of said connect rod.

* * * * *